United States Patent
Cessel et al.

(10) Patent No.: US 11,789,667 B2
(45) Date of Patent: Oct. 17, 2023

(54) PRINTER COLOUR DEVIATION DETECTION

(71) Applicant: Hewlett-Packard Development Company, L.P., Spring, TX (US)

(72) Inventors: Gianni Cessel, Sant Cugat del Valles (ES); Santiago Felez Navarro, Sant Cugat del Valles (ES); Marcos Casaldaliga Albisu, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/765,149

(22) PCT Filed: Nov. 5, 2019

(86) PCT No.: PCT/US2019/059810
§ 371 (c)(1),
(2) Date: Mar. 30, 2022

(87) PCT Pub. No.: WO2021/091534
PCT Pub. Date: May 14, 2021

(65) Prior Publication Data
US 2022/0357900 A1 Nov. 10, 2022

(51) Int. Cl.
*G06F 3/12* (2006.01)
(52) U.S. Cl.
CPC .......... *G06F 3/1208* (2013.01); *G06F 3/1207* (2013.01); *G06F 3/1229* (2013.01); *G06F 3/1204* (2013.01)

(58) Field of Classification Search
CPC .... G06F 3/1208; G06F 3/1207; G06F 3/1229; G06F 3/1204; H04N 1/6044
USPC .......................................... 358/1.8
See application file for complete search history.

(56) References Cited

U.S. PATENT DOCUMENTS

| | | | |
|---|---|---|---|
| 6,351,308 | B1 | 2/2002 | Mestha |
| 6,538,770 | B1 | 3/2003 | Mestha |
| 7,839,498 | B2 | 11/2010 | Mestha et al. |
| 7,961,321 | B2 | 6/2011 | Bonikowski et al. |
| 9,132,681 | B2 | 9/2015 | Arnabat Benedicto et al. |
| 9,662,909 | B2 | 5/2017 | Gracia Verdugo et al. |
| 2002/0000632 | A1 | 1/2002 | Kobayashi et al. |
| 2003/0156299 | A1* | 8/2003 | Martinez .............. H04N 1/6052 358/1.9 |
| 2005/0018219 | A1 | 1/2005 | Senn et al. |

(Continued)

FOREIGN PATENT DOCUMENTS

JP 2003014545 A 1/2003

*Primary Examiner* — Darryl V Dottin

(57) ABSTRACT

Apparatus is described that comprises a printer carriage (100), comprising a printhead (105), at least one sensor (101, 102) for scanning an image deposited on a print media by the printhead (105) and a spectrophotometer (104) connected to the at least one sensor (101, 102) for generating data based on a reference image (120) on a test print media (110). The sensor (101, 102) is calibrated based on the generated data to detect a specific ICC profile, and wherein, in use, the sensor (101, 102) scans and digitizes an image of a final print media as the image is being printed on the final print media; and wherein the sensor (101, 102) is connected to a controller (106) that performs image quality analysis of the digitized image to determine whether colour deviation has occurred.

15 Claims, 5 Drawing Sheets

(56) References Cited

U.S. PATENT DOCUMENTS

| | | |
|---|---|---|
| 2009/0153924 A1 | 6/2009 | Frei |
| 2017/0111540 A1 | 4/2017 | Gracia Verdugo et al. |
| 2017/0244961 A1 | 8/2017 | Berfanger et al. |
| 2019/0137339 A1* | 5/2019 | Olson ........................ G01J 3/10 |
| 2019/0301941 A1* | 10/2019 | Kawabata ................. G01J 3/52 |

* cited by examiner

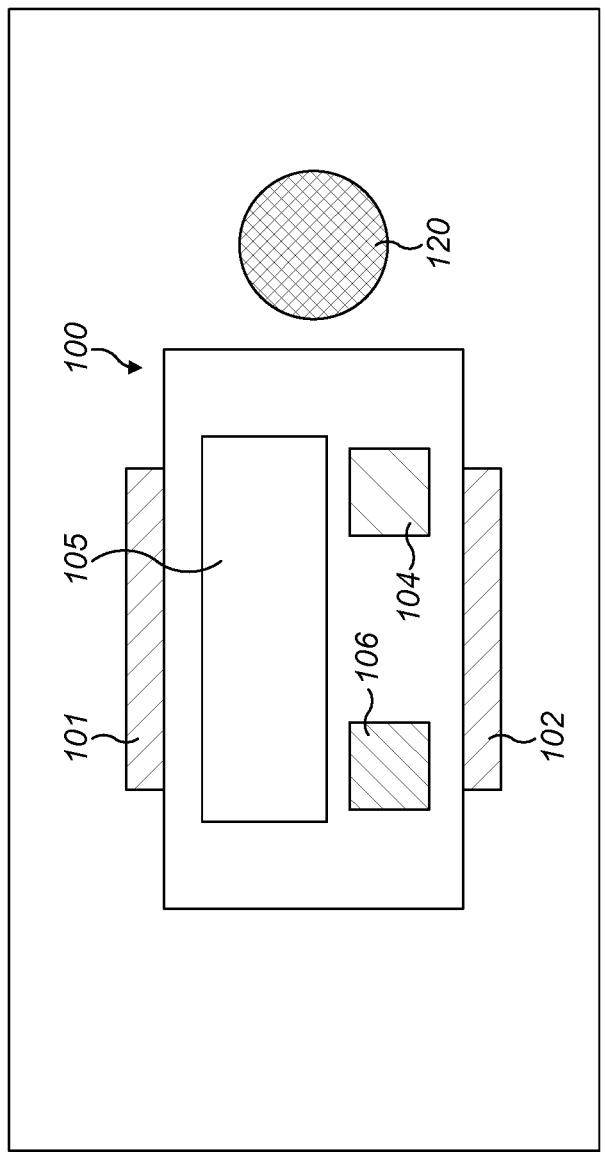

PRINTER COLOUR DEVIATION DETECTION

BACKGROUND

In many colour printing systems, such as latex printing, one of the key problems that can occur is colour accuracy degradation particularly during long printing jobs. In order to ensure a consistent image quality during printing jobs, printed images may be accurately scanned in order to be able to detect any defects, such as colour degradation. Therefore, it is advantageous to have a method and apparatus to detect if colour accuracy degradation is occurring whilst printing at speed, to ensure any degradation is detected quickly to guarantee that printing productivity remains high and accurate.

BRIEF DESCRIPTION OF DRAWINGS

The drawings provided are to illustrate various examples of the subject matter described herein in this disclosure related to methods and systems for printer colour deviation detection and are not intended to limit the scope of the subject matter. The drawings are not necessarily to scale.

FIG. 1 is a schematic showing a bottom view of an example printer carriage as described herein.

DETAILED DESCRIPTION

Figure 2A:
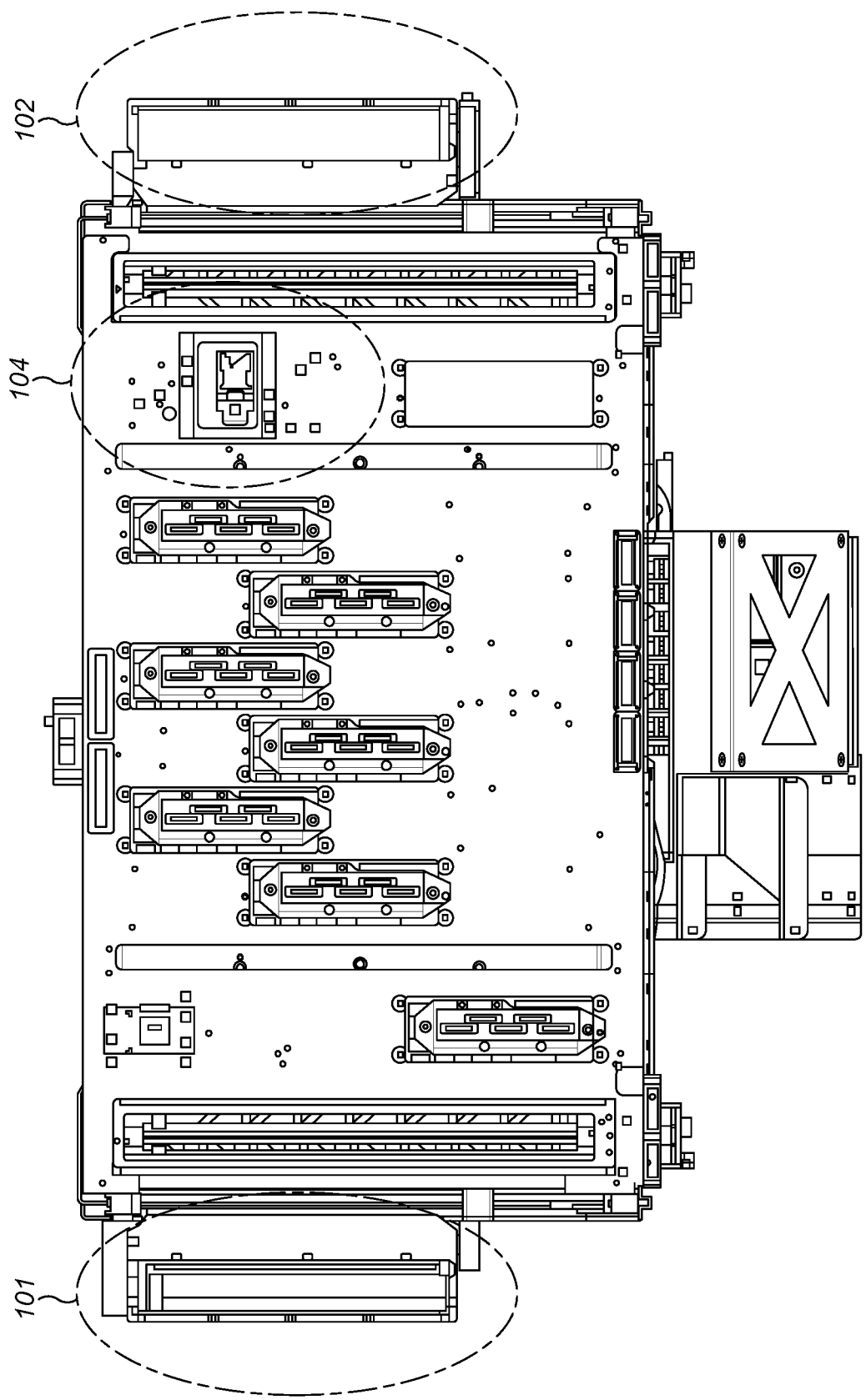
FIG. 2A is an example of the bottom view of a printer carriage comprising a spectrophotometer.

A number of examples will be discussed in detail below. Where like parts in different Figures are discussed, the same reference numeral will be used. Each of the features disclosed in reference to the apparatus may be applied to the method or the instructions executable by a processor.

Colour degradation can occur during printing jobs, particularly those that take long periods of time. Manually detecting if colour degradation has occurred is not always possible due to the size of the print jobs, or even if a manual review of the print job is possible, then this process requires the comparison of the image being printed with a reference image. Such a comparison is usually done externally to the printer. This is time consuming and inefficient. If the degradation is not detected during the printing process and defects are found, the print job will need to be re-run. As such, there is a need for a method and apparatus to detect defects in the colour accuracy throughout the printing process to ensure high productively and efficiency during the process.

The present disclosure provides an apparatus, a method and a non-transitory machine-readable storage medium which may be encoded with instructions executable by a processor 160 detecting colour deviation in a printer.

FIG. 1 shows a schematic view of a printer carriage 100 which may be employed in a printer, such as a latex printer.

A printer carriage may comprise a printhead 105; at least one sensor 101, 102 for scanning an image deposited on a print media by the printhead 105; a spectrophotometer 104 connected to the at least one sensor 101, 102 for generating data based on a reference image 120 on a test print media 110; wherein the sensor 101, 102 is calibrated based on the generated data to detect a specific International Colour Consortium (ICC) profile, and wherein, in use, the sensor 101, 102 scans and digitizes an image of a final print media as the image is being printed on the final print media; and wherein the sensor 101, 102 is connected to a controller 106 that performs image quality (IQ) analysis of the digitized image to determine whether colour deviation has occurred.

The printer carriage 100 may comprise at least one sensor or multiple sensors 101, 102 depending on the printer being used and the print job. The number of sensors will depend on the surface to be digitized. For example, a printer carriage 100 may comprise two sensors 101, 102 provided at opposite ends of the printer carriage 100. During a printing job, one of the sensors 101 may be positioned at a leading edge of the printer carriage 100, while the other of the sensors 102 may be provided at a trailing edge of the printer carriage as shown in FIG. 2A. The sensor 102 at the trailing edge of the printer carriage 100 may acquire and digitize an image of a final print media that has been deposited by the printhead 105 during the printing process. Alternatively, wherein a single sensor is present 101, 102 the single sensor may acquire and digitize an image of a final print media that has been deposited by the printhead 105 during the printing process.

The printer carriage 100 may also comprise a spectrophotometer 104. Spectrophotometers are devices which produce a light beam containing wavelengths in a narrow band around a selected wavelength, and a means of measuring the ratio of that beam's intensity. Spectrophotometers are able to accurately measure the intensity of light. The accuracy of the spectrophotometer 104 is beneficial as a means for accurately calibrating the sensor 101, 102 in a printer carriage 100 to detect a specific ICC profile. Therefore, use of a spectrophotometer ensures reliable measurements that meet international standards.

Figure 2B:
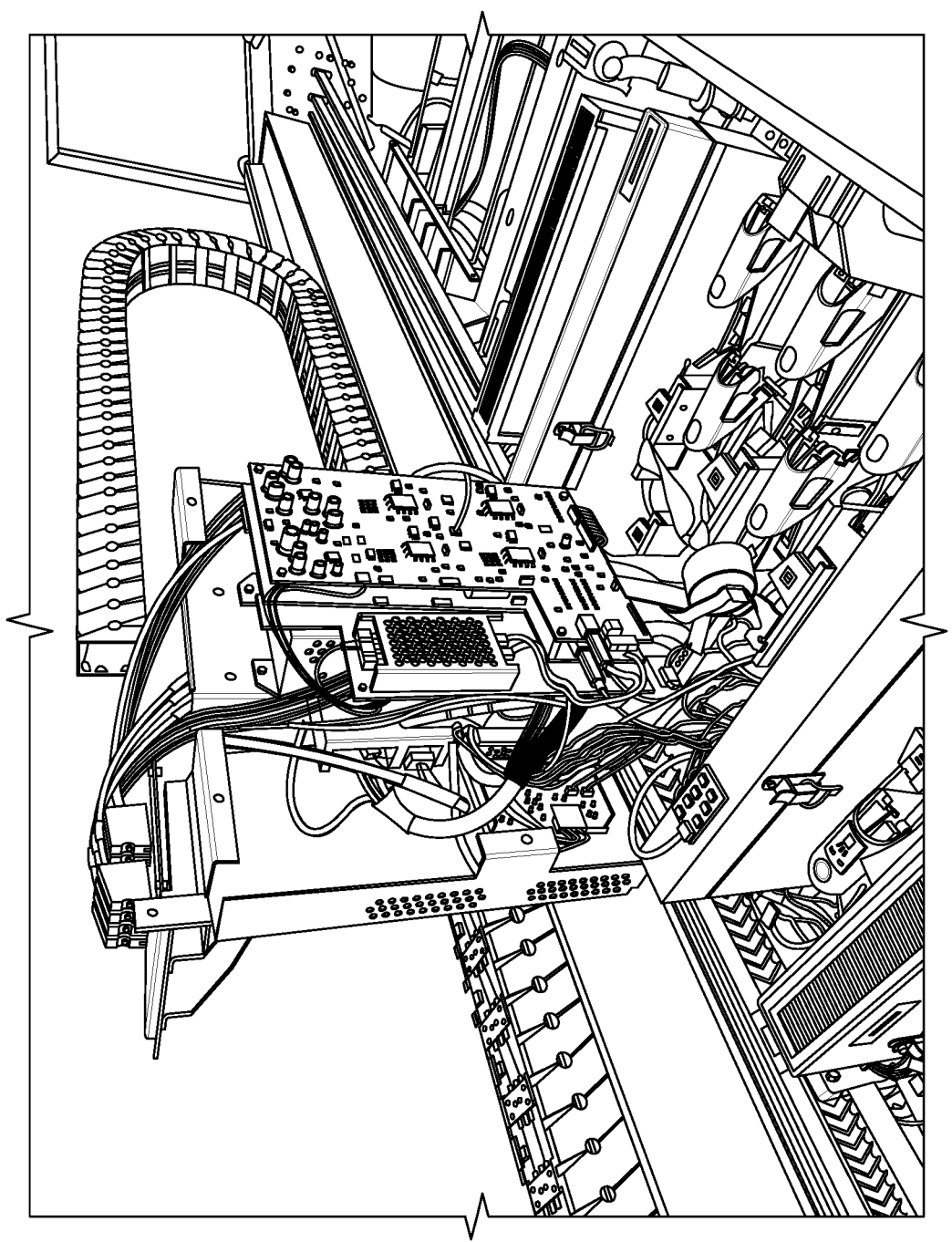
FIG. 2B is an example of a printer carriage comprising a spectrophotometer and a scan.

The spectrophotometer 104 may be located within the printer carriage as shown in FIG. 2B. This is advantageous because it allows the process of determining the reference image from the test print media to be automated as the spectrophotometer is located within the printer carriage. The spectrophotometer 104 may be connected to the at least one sensor 101, 102 in a number of different configurations. For example, the spectrophotometer 104 may be connected to the sensor 101, 102 via a computing device. The spectrophotometer 104 is used for generating data based on a reference image 120 on a test print media 110. The reference image 120 on the test print media 110 will have a specific ICC profile associated with it. The user will determine which reference image 120 is most appropriate depending on the final print media and the final requirements.

The at least one sensor 101, 102 is calibrated based on the generated data to detect a specific ICC profile. The specific ICC profile may also be generated by the user or can be selected from a set of previously generated profiles. The calibration of the sensor 101, 102, based on the spectrophotometer 104 generated data, means that the sensor 101, 102 can focus on a specific ICC profile. The test print media 120 used, such as paper or fabric, and the substrate used, such as ink, water-based ink, latex ink, will have an effect on the generated data from the spectrophotometer 104 and therefore determine the calibration of the sensor 101, 102. The colour calibration of the sensor may be performed for the media in use, to ensure the calibration is accurate for the media and the substrate being used in a particular print job. The sensor 101, 102 may be calibrated to a base level which is established by generated data from the spectrophotometer 104. The sensor 101, 102, in communication with a controller 106, will determine whether the digitized image from the final print media falls below this base level during printing.

The sensor 101, 102 scans and digitizes an image of a final print media as the desired image is being printed on the final print media. The processing speed of the sensor 101, 102 may be set such that it is at least as high as the printing speed of the printhead 105, such as for example at least a processing speed of approximately 91.44 m/min (meters per minute) (60 inch/sec (inches per second)) for image scanning and digitization, which allows for real-time capturing of the deposited image during the printing of the final print media. The speed may be higher or lower depending on the printer. The processing speed of the sensor 101, 102 may be between approximately 0 to approximately 152.4 m/min (0 to 100 inch/sec), approximately 15.24 to approximately 152.4 m/min (10 to 100 inch/sec), approximately 30.48 to approximately 152.4 m/min (20 to 100 inch/sec), approximately 45.72 to approximately 152.4 m/min (30 to 100 inch/sec), approximately 60.96 to approximately 152.4 m/min (40 to 100 inch/sec), approximately 76.2 to approximately 152.4 m/min (50 to 100 inch/sec), approximately 91.44 to approximately 152.4 m/min (60 to 100 inch/sec), approximately 106.68 to approximately 152.4 m/min (70 to 100 inch/sec), approximately 121.92 to approximately 152.4 m/min (80 to 100 inch/sec) or approximately 137.16 to approximately 152.4 m/min (90 to 100 inch/sec). The processing speed of the sensor 101, 102 may be approximately 15.24 m/min (10 inch/sec), approximately 30.48 m/min (20 inch/sec), approximately 45.72 m/min (30 inch/sec), approximately 60.96 m/min (40 inch/sec), approximately 76.2 m/min (50 inch/sec), approximately 91.44 m/min (60 inch/sec), approximately 106.68 m/min (70 inch/sec), approximately 121.92 m/min (80 inch/sec), approximately 137.16 m/min (90 inch/sec), approximately 152.4 m/min (100 inch/sec). Ordinary spectrophotometers are unable to carry out colour deviation detection at a high printing speeds, such as approximately 91.44 m/min (meters per minutes) (60 inch/sec (inches per second)).

The sensor 101, 102 may be connected to a controller 106 and IQ analysis of the digitized image is carried out to determine whether colour deviation has occurred. This colour deviation may be detected as a result of the sensor 101, 102 acquiring the digitized image and detecting a colour that falls below the base level to which the sensor 101, 102 has been calibrated. The sensor 101, 102 may detect a change in the colour and relay this information to a controller 106 for further IQ analysis. The controller 106 may compare the digitized image to the original image sent to print or images previously captured by the sensor 101, 102. Additionally, or alternatively, the controller 106 may provide the digitized scanned image and the reference image to an external device for further IQ analysis. Therein, the digitized scanned image and the reference image may be analysed by IQ processing and a decision regarding the image quality may be taken by the user. The controller 106 may perform the comparison with the data provided or may relay the information to an additional system, e.g. a receiver or a graphic user interface, to warn the operator of deviations.

The controller 106 may be part of the printer carriage, as shown in FIG. 1, integrated with the sensor, separate from the sensor, or external to the printer carriage. The user may programme the sensor 101, 102 and/or the controller 106 to set the level of deviation to be rejected by the sensor 101, 102 and/or the controller 106. The controller 106 may then communicate this change to a receiver that alerts the user via a graphic user interface and allow the user the possibility to review the deviation on a screen. Alternatively, the controller 106 may communicate this change directly to a graphic user interface. Alternatively, or additionally, the controller and/or the receiver and/or graphic user interface may communicate a change to the user in the form of a sound, lights, noise, an automated email or any combination thereof. The graphic user interface and the receiver may be a part of the printer or they may be separate. The result of the colour deviation detection may be used for determining printer actions such as stopping the print job, re-calibrating the sensor, reprinting the job or allowing the user to make a different decision.

The present disclosure provides a method comprising running a test print media 110 through a printer; using a spectrophotometer 104 located within a printer carriage 100 for generating data based on a reference image 120 on the test print media 110; calibrating a sensor 101, 102 positioned in the printer carriage 100 based on the reference image to detect a specific ICC profile; running a final print media through the printer to print a final image; using the calibrated sensor 101, 102 to scan and digitize the image on the final print media as the image is being printed and produce a digitized image; using a controller 106 to detect colour deviation in the digitized image; and communicating any changes in colour to a receiver.

Figure 3:
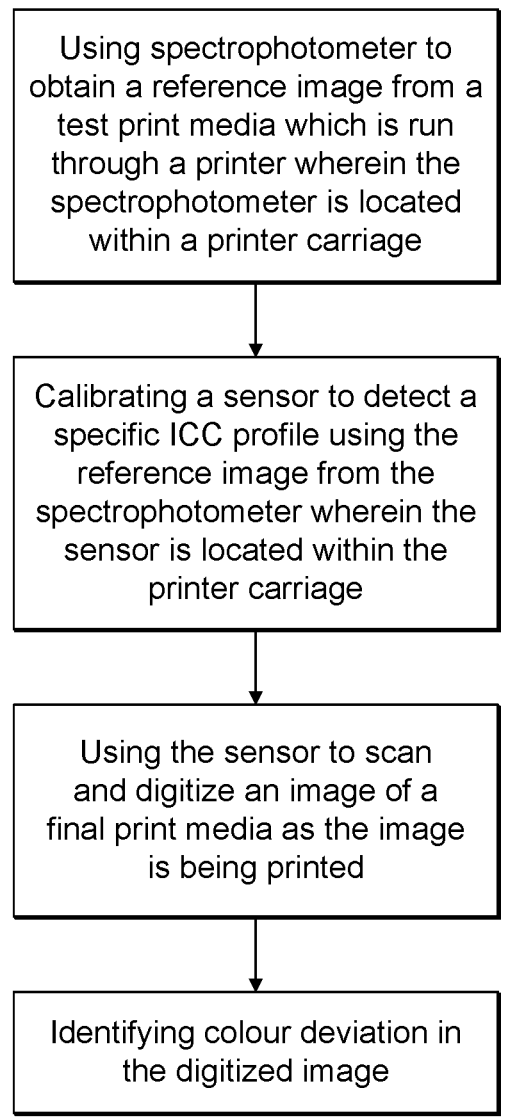
FIG. 3 is a flowchart illustrating an example method for detecting colour deviation.

The present disclose also provides a method, as shown in FIG. 3, using a spectrophotometer 104 to obtain a reference image from a test print media 110 which is run through a printer wherein the spectrophotometer is located within a printer carriage 100; calibrating a sensor 101, 102 to detect a specific ICC profile using the reference image from the spectrophotometer 104 wherein the sensor 101, 102 is located within the printer carriage 100; using the sensor 101, 102 to scan and digitize an image of a final print media as the image is being printed; and identifying colour deviation in the digitized image. The method may include one more of the features disclosed in reference to the printer carriage 100. In particular, the method may comprise setting the processing speed of the sensor 101, 102 at least at approximately 91.44 m/min (meters per minutes) (60 inch/sec (inches per second)) or more, depending on the printer speed. The processing speed of the sensor 101, 102 may be between approximately 0 to approximately 152.4 m/min (0 to 100 inch/sec), approximately 15.24 to approximately 152.4 m/min (10 to 100 inch/sec), approximately 30.48 to approximately 152.4 m/min (20 to 100 inch/sec), approximately 45.72 to approximately 152.4 m/min (30 to 100 inch/sec), approximately 60.96 to approximately 152.4 m/min (40 to 100 inch/sec), approximately 76.2 to approximately 152.4 m/min (50 to 100 inch/sec), approximately 91.44 to approximately 152.4 m/min (60 to 100 inch/sec), approximately 106.68 to approximately 152.4 m/min (70 to 100 inch/sec), approximately 121.92 to approximately 152.4 m/min (80 to 100 inch/sec) or approximately 137.16 to approximately 152.4 m/min (90 to 100 inch/sec). The processing speed of the sensor 101, 102 may be approximately 15.24 m/min (10 inch/sec), approximately 30.48 m/min (20 inch/sec), approximately 45.72 m/min (30 inch/sec), approximately 60.96 m/min (40 inch/sec), approximately 76.2 m/min (50 inch/sec), approximately 91.44 m/min (60 inch/sec), approximately 106.68 m/min (70 inch/sec), approximately 121.92 m/min (80 inch/sec), approximately 137.16 m/min (90 inch/sec), approximately 152.4 m/min (100 inch/sec).

The method may further comprise employing a controller 106. The controller 106 may perform the comparison with the data provided or may relay the information to an additional system, e.g. a receiver or a graphic user interface, to warn the operator of deviations. The controller 106 may be used in conjunction with the sensor 101, 102 to carry out IQ analysis. The sensor 101, 102 may detect from the digitized image of the final print media that the colour in the final print media falls below a base level, wherein the base level is a result of the calibration process. The sensor 101, 102 may be programmed to set the level of colour deviation to be rejected. The controller 106 may analyse the digitized scanned image and the reference image for IQ analysis or the controller 106 may scan the digitized scanned image and the reference image to an external device, such as a receiver, for further IQ analysis. The controller 106 may be programmed to set the level of colour deviation to be rejected. A decision regarding the image quality may be taken by the user, such as stopping the print job, recalibrating the sensor or reprinting the job. The controller 106 and/or the receiver may be connected to a graphic user interface to alert the user to colour deviation changes and allow the user to make a decision to stop the print job, re-calibrate the sensor, reprint the job or make a different decision. Alternatively, or additionally, the controller and/or the receiver and/or graphic user interface may communicate a change to the user in the form of a sound, lights, noise, an automated email or any combination thereof.

Figure 4:
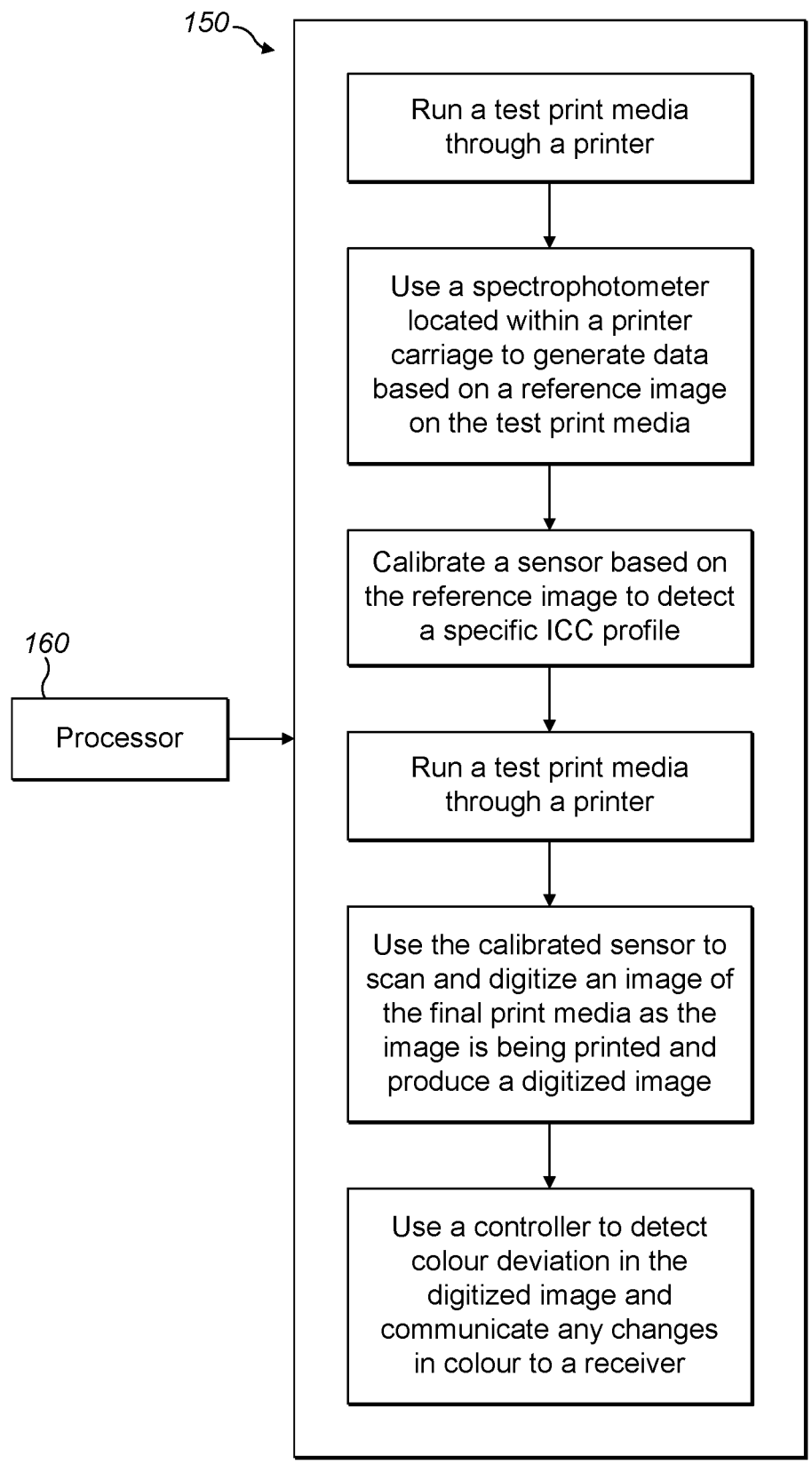
FIG. 4 is a flowchart illustrating example instructions executable by a processor.

The present disclosure provides a non-transitory machine-readable storage medium which may be encoded with instructions 150 executable by a processor 160 FIG. 4 is a flowchart illustrating example instructions 150 executable by a processor 160.

A non-transitory machine-readable storage medium encoded with instructions 150 executable by a processor 160, the machine-readable storage medium comprising instructions to run a test print media 110 through a printer; use a spectrophotometer 104 located within a print carriage 100 to generate data based on a reference image 120 on the test print media 110; calibrate a sensor 101, 102 based on the reference image to detect a specific ICC profile; run a final print media through the printer to print a final image; use the calibrated sensor 101, 102 to scan and digitize an image of the final print media as the image is being printed and produce a digitized image; use a controller to detect colour deviation in the digitized image; and communicate any changes in colour to a receiver. The non-transitory machine-readable storage medium may include instructions 150 for setting the processing speed of the sensor at least at approximately 91.44 m/min (meters per minutes) (60 inch/sec (inches per second)) or more, depending on the printer speed. The processing speed of the sensor 101, 102 may be between approximately 0 to approximately 152.4 m/min (0 to 100 inch/sec), approximately 15.24 to approximately 152.4 m/min (10 to 100 inch/sec), approximately 30.48 to approximately 152.4 m/min (20 to 100 inch/sec), approximately 45.72 to approximately 152.4 m/min (30 to 100 inch/sec), approximately 60.96 to approximately 152.4 m/min (40 to 100 inch/sec), approximately 76.2 to approximately 152.4 m/min (50 to 100 inch/sec), approximately 91.44 to approximately 152.4 m/min (60 to 100 inch/sec), approximately 106.68 to approximately 152.4 m/min (70 to 100 inch/sec), approximately 121.92 to approximately 152.4 m/min (80 to 100 inch/sec) or approximately 137.16 to approximately 152.4 m/min (90 to 100 inch/sec). The processing speed of the sensor 101, 102 may be approximately 15.24 m/min (10 inch/sec), approximately 30.48 m/min (20 inch/sec), approximately 45.72 m/min (30 inch/sec), approximately 60.96 m/min (40 inch/sec), approximately 76.2 m/min (50 inch/sec), approximately 91.44 m/min (60 inch/sec), approximately 106.68 m/min (70 inch/sec), approximately 121.92 m/min (80 inch/sec), approximately 137.16 m/min (90 inch/sec), approximately 152.4 m/min (100 inch/sec). The non-transitory machine-readable storage medium may also include instructions 150 for employing a controller to communicate with a graphic user interface to alert the user to colour changes. The instructions 150 may also include programming the sensor 101, 102 and/or the controller 106 are programmed to set the level of colour deviation to be rejected.

The machine readable storage medium may be any electronic, magnetic, optical or other physical storage device that stores executable instructions. Thus, the machine-readable storage medium may be, for example, Random Access Memory (RAM), an Electrically-Erasable Programmable Read-Only Memory (EEPROM), a storage drive, and optical disc, and the like.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The features of any dependent claim may be combined with the features of any of the independent claims or other dependent claims.

The invention claimed is:

1. Printer carriage, comprising:
a printhead;
at least one sensor for scanning an image deposited on a print media by the printhead;
a spectrophotometer connected to the at least one sensor for generating data based on a reference image on a test print media;
wherein the sensor is calibrated based on the generated data to detect a specific ICC profile, and wherein, during print operation, the sensor scans and digitizes an image of a final print media as the image is being printed on the final print media; and
wherein the sensor is connected to a controller that performs image quality analysis of the digitized image to determine whether colour deviation has occurred.

2. A printer carriage according to claim 1, wherein a processing speed of the sensor is approximately 91.44 m/min.

3. A printer carriage according to claim 1, wherein the controller is integrated into the printer carriage.

4. A printer carriage according to claim 1, wherein the controller is connected to the sensor via a computing device.

5. A printer carriage according to claim 1, wherein the controller is also connected to a graphic user interface to alert the user to colour deviation changes.

6. A printer carriage according to claim 1, wherein the printer carriage is used in a latex printer.

7. A method comprising:
using a spectrophotometer to obtain a reference image from a test print media which is run through a printer wherein the spectrophotometer is located within a printer carriage;

calibrating a sensor to detect a specific ICC profile using the reference image from the spectrophotometer wherein the sensor is located within the printer carriage;

using the sensor to scan and digitize an image of a final print media as the image is being printed; and identifying colour deviation in the digitized image.

8. A method according to claim 7, wherein a processing speed of the sensor is approximately 91.44 m/min.

9. A method according to claim 7, further comprising using a controller to carry out image quality analysis.

10. A method according to claim 7, wherein the controller is also connected to a graphic user interface to alert the user to colour deviation.

11. A method according to claim 7, comprising programming the sensor and/or the controller to set the level of colour deviation to be rejected.

12. A non-transitory machine-readable storage medium encoded with instructions executable by a processor, the machine-readable storage medium comprising instructions to:

run a test print media through a printer;

use a spectrophotometer located within a printer carriage to generate data based on a reference image on the test print media;

calibrate a sensor based on the reference image to detect a specific ICC profile;

run a final print media through the printer to print a final image;

use the calibrated sensor to scan and digitize an image of the final print media as the image is being printed and produce a digitized image;

use a controller to detect colour deviation in the digitized image; and communicate any changes in colour to a receiver.

13. A non-transitory machine-readable storage according to claim 12, wherein a processing speed of the sensor is approximately 91.44 m/min.

14. A non-transitory machine-readable storage according to claim 12, further comprising instructions to alert a user to colour changes.

15. A non-transitory machine-readable storage according to claim 12, wherein the sensor and/or the controller are programmed to set the level of colour deviation to be rejected.

* * * * *